(12) United States Patent
Krell et al.

(10) Patent No.: US 7,243,583 B2
(45) Date of Patent: Jul. 17, 2007

(54) LATHE, IN PARTICULAR MULTI-SPINDLE AUTOMATIC LATHE

(75) Inventors: Markus Krell, Bundesrepublik (DE); Albert Herrscher, Bundesrepublik (DE)

(73) Assignee: Alfred H. Schutte GmbH & Co. KG, Cologne (DE)

(*) Notice: Subject to any disclaimer, the term of this patent is extended or adjusted under 35 U.S.C. 154(b) by 289 days.

(21) Appl. No.: 11/099,069

(22) Filed: Apr. 5, 2005

(65) Prior Publication Data

US 2005/0235788 A1  Oct. 27, 2005

(30) Foreign Application Priority Data

Apr. 21, 2004 (DE) .................... 10 2004 019 936

(51) Int. Cl.
 *B24B 13/00* (2006.01)
 *B24B 17/00* (2006.01)
(52) U.S. Cl. ........................................ 82/124; 82/149
(58) Field of Classification Search ................ 82/124, 82/122, 121, 123, 129, 149
See application file for complete search history.

(56) References Cited

U.S. PATENT DOCUMENTS

| | | | | |
|---|---|---|---|---|
| 4,457,193 A | * | 7/1984 | Matthey | 82/129 |
| 4,612,832 A | * | 9/1986 | Ushigoe et al. | 82/129 |
| 4,654,955 A | * | 4/1987 | Mathie | 483/19 |
| 4,763,549 A | * | 8/1988 | Hata et al. | 82/124 |
| 5,083,485 A | * | 1/1992 | Link et al. | 82/124 |
| 5,153,973 A | * | 10/1992 | Kitamura | 29/33 P |
| 5,175,914 A | * | 1/1993 | Mitsukuchi et al. | 29/27 C |
| 5,214,829 A | * | 6/1993 | Minagawa | 29/27 C |
| 5,289,622 A | * | 3/1994 | Minagawa | 29/27 R |
| 5,392,501 A | * | 2/1995 | Sonnek | 29/27 C |
| 5,417,130 A | * | 5/1995 | Dorsch | 82/1.11 |
| 5,751,586 A | * | 5/1998 | Grabovac | 700/169 |
| 5,885,199 A | * | 3/1999 | Shao | 483/19 |
| 6,128,812 A | * | 10/2000 | Link et al. | 29/40 |
| 6,185,818 B1 | * | 2/2001 | Ito et al. | 29/889.7 |
| 6,651,535 B2 | * | 11/2003 | Hafla et al. | 82/121 |
| D489,077 S | * | 4/2004 | Bloch | D15/127 |

(Continued)

FOREIGN PATENT DOCUMENTS

DE  32 25 320 A1  4/1984

*Primary Examiner*—Willmon Fridie, Jr.
(74) *Attorney, Agent, or Firm*—Fay Sharpe LLP

(57) ABSTRACT

The multi-spindle automatic lathe (10) has an apparatus for machining the rear side of a workpiece (15). For this, it is provided with a transfer device (21) for removing a workpiece machined at its front side from a primary workpiece spindle (15) of the machine and for transferring the workpiece to a machining station (22) for the rear side machining, whereby the transfer device comprises a gripper (23) as well as a translation device (24) moveable parallel or coaxially to the workpiece spindle (14) between this and a rear wall (19) of the machining chamber, which translation device takes up the workpiece from the gripper for transfer to the machining station for the rear side machining. So as to avoid collision of the tools for the front and rear side machining or their actuation carriage and to execute the machining at the rear side of the workpieces largely independently from the front side machining, the machining station (22) for the rear side machining is located outside the machining chamber (16) for the front side machining and comprises a secondary workpiece reception (29) which can be moved axially between the translation device (24) and a work position for the rear side machining.

20 Claims, 4 Drawing Sheets

U.S. PATENT DOCUMENTS

| | | | |
|---|---|---|---|
| 6,722,236 B1 * | 4/2004 | Baldini et al. | 82/117 |
| 6,758,117 B2 * | 7/2004 | Baumann et al. | 82/117 |
| D496,947 S * | 10/2004 | Baulk | D15/130 |
| 7,039,992 B2 * | 5/2006 | Tokuma et al. | 29/27 C |
| 7,043,805 B2 * | 5/2006 | Tokuma et al. | 29/27 C |

* cited by examiner

LATHE, IN PARTICULAR MULTI-SPINDLE AUTOMATIC LATHE

BACKGROUND

The invention relates to a lathe, in particular a multi-spindle automatic lathe having an apparatus for machining the rear side of a workpiece and a take-over device for removing a workpiece machined at its front side from a primary workpiece spindle of the machine and for transferring the workpiece to a machining station for rear side machining. In one embodiment, the take-over device comprises a gripper traversable parallel or coaxial to the workpiece spindle between it and a rear side of the machining chamber of the machine, and a translation device, which takes over the workpiece from the gripper for the transfer to the machining station for the rear side machining.

Such a lathe is for example known from DE 32 25 320 A1, expressly incorporated herein by reference. In this known machine, the machining station for the rear side machining is provided at a rear wall of the machining chamber, where the workpieces removed from the primary workpiece spindle by the gripper are transferred to the machining station with the help of the translation device. The arrangement of the machining station for the rear side machining at the rear wall of the of the machining chamber, in which are located the tools for the front side machining of the workpieces clamped in the spindle drum, additionally limits the space. That is, the paths along which the various tools can move for the front side machining and for the rear side machining, respectively, are comparatively small, in order that the various tools do not collide with one another during the machining of the various workpieces. Therefore, only relatively simple machining operations can be carried out at the rear side of the workpieces, after these have been removed from the primary workpiece spindle and received in the machining station for the rear side machining, whereas the machining processes are only allowed to take up short displacement paths of the tools.

There is a need for a lathe of the above-mentioned type with which machining steps which are comparatively complicated and possibly need several tools can be carried out at the machining station for the rear side machining, without having the danger of collisions with the tools for the front side machining.

SUMMARY

In accordance with one aspect, a lathe, in particular a multi-spindle automatic lathe, is provided. More particularly, in accordance with this aspect, the lathe has an apparatus for machining the rear side of a workpiece and a take-over device for removing a workpiece machined at its front side from a primary workpiece spindle of the machine and for transferring the workpiece to a machining station for rear side machining. The take-over device includes a gripper traversable parallel or coaxial to the workpiece spindle between the workpiece spindle and a rear side of the machining chamber of the machine, and a translation device, which takes over the workpiece from the gripper for the transfer to the machining station for the rear side machining. The machining station for the rear side machining is outside the machining chamber for the front side machining and comprises a secondary workpiece reception which is axially transferable between the translation device and a work position for the rear side machining. With such configuration, the secondary workpiece reception can preferably be traversed parallel to the movement direction of the gripper; but it is also possible to design the secondary workpiece reception traversable at a right angle to the movement direction of the gripper.

According to one exemplary embodiment, the machining station for the rear side machining is no longer placed in the same machining chamber in which the tools for the front side machining are arranged, whereas the machining chamber is not necessarily meant to be space limited by walls or other similar physical means, but is the machining region in general in which the tools can act for the front side machining. In this embodiment, an equalization of the machining stations for the front side machining in the machining chamber and for the rear side machining takes place. That is, a larger spatial distance between the tools for the front side machining and those for the rear side machining is created, so that these cannot collide with one another, even if the tools have to traverse comparatively large machining paths during the rear side machining. For this, the workpiece transfer essentially takes place in two or three steps with two translatory movements, which take place in a first step by means of the gripper and by means of the secondary workpiece reception in a second step, whereby the workpiece is transferred to the secondary workpiece reception with the help of the translation device. This multi-step translation process has the advantage that the traversing path is comparatively small in each translation step and a sufficient distance between the machining station for the rear side machining from the work region of the front side machining is created at the same time.

The translation device can be arranged in the region of the rear wall or the rear side of the machining chamber for the front side machining and includes a change-over device which can be switched between at least two switching positions around a swivel axis. The at least two switching positions are the position in which the change-over device receives a workpiece received in the gripper by means of a first fork element or the like and the position in which the change-over device transfers a workpiece received therein to the secondary workpiece reception in corresponding axial position therewith with a second fork element or the like.

The machining station for the rear side machining can be arranged in a secondary machining chamber which is arranged beyond the rear side of the machining chamber for the front side machining. The secondary workpiece reception can conveniently include a preferably rotatably driveable workpiece spindle which allows a machining of the workpiece similar to the primary workpiece spindle or the primary workpiece spindles. It is also possible that the machining station for the rear side machining comprises several secondary workpiece spindles which can then be arranged at a secondary spindle drum.

The secondary workpiece spindles can also be axially traversable and a workpiece transfer then takes place from one to the other secondary workpiece spindle by means of the translation device. That is, this does not only serve to remove a workpiece from the gripper and to transfer it to a secondary workpiece spindle, but it is also used in this embodiment to transfer a partially machined workpiece from a secondary workpiece spindle to another or remove it therefrom, so as to then hand it over to a workpiece discharge apparatus.

The workpieces together with the workpiece chucks can be removed from the primary machining spindle and can be transferred to the machining station for the rear side machining. The workpieces then keep their clamp in the workpiece chuck during the transfer process and are already in the right position at the reception of the secondary workpiece spindle. However, particularly if bar stock is machined with the multi-spindle automatic lathe, it is advantageous if the workpieces are removed from the primary machining spindle without the workpiece chuck, but are then clamped by a workpiece chuck in the gripper and then stay in one and the same workpiece chuck during the entire rear side machining until the discharge of the completely machined workpiece.

In one particular exemplary embodiment, the gripper can be arranged at an axially traversable slider in an eccentric manner and the slider can be rotated around its central axis. This enables a particularly simple and fast transfer between gripper and translation device, which, at reaching the axial position of the slider necessary for the transfer, simply takes place by its rotation, during which the gripper with the workpiece received therein arranged at the slider in an eccentric manner reaches the gripping region of the translation device, and thereby transfers the workpiece to it. The slider can include a cylindrical stroke piston or stroke cylinder adjustable in the circumferential direction.

In a similar manner, it is also possible that the secondary workpiece reception or the secondary workpiece spindle(s) forming same is/are arranged at an axially traversable secondary slider in an eccentric manner and that the secondary slider(s) can be rotated around its/their central axis (axes).

DETAILED DESCRIPTION

Figure 1:
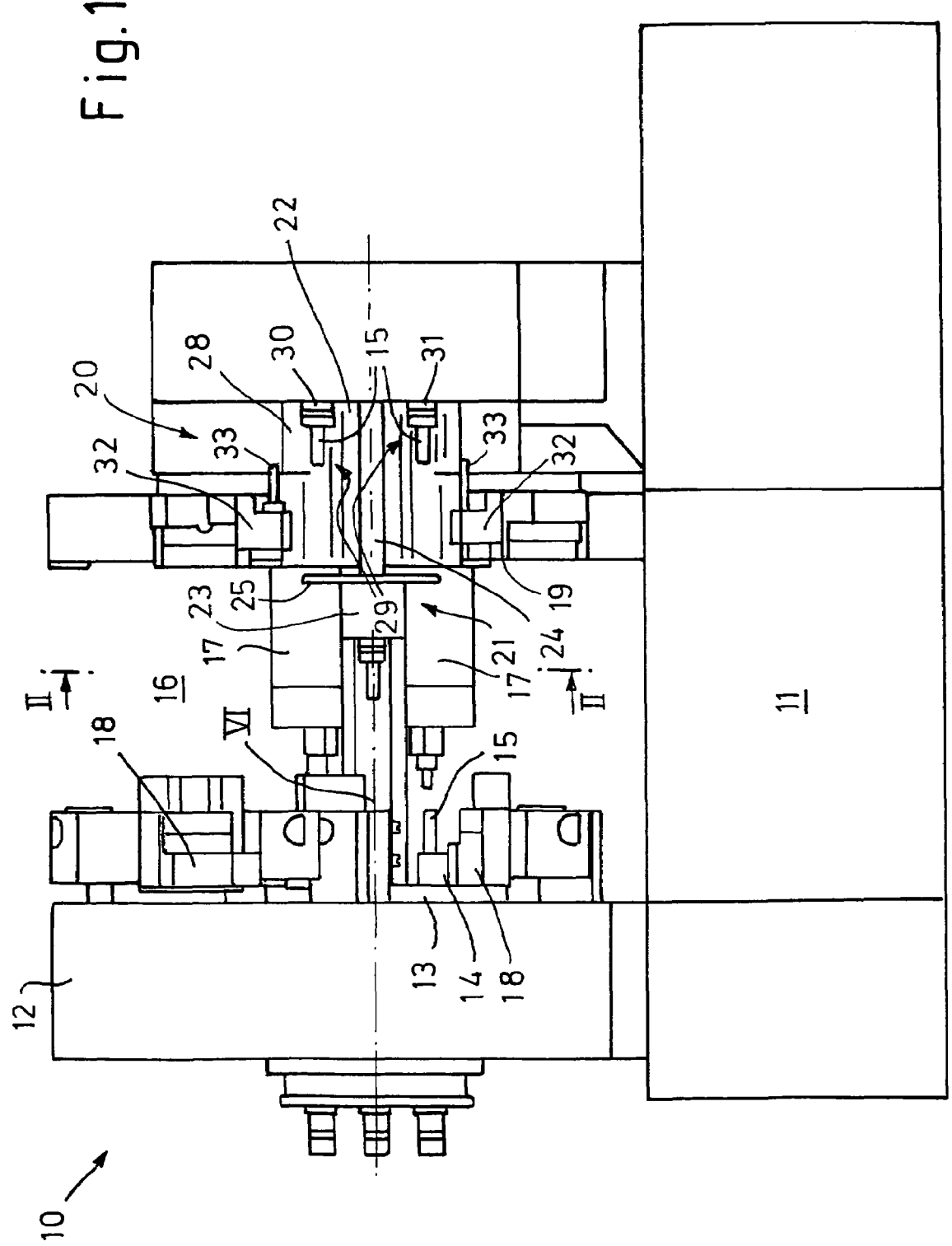
FIG. 1 shows a multi-spindle automatic lathe according to a first embodiment in a schematic side view.

The multi-spindle automatic lathe 10 comprises a machine bed 11 in a known manner and a spindle box 12 projecting therefrom, in which is received a spindle drum 13 with several primary workpiece spindles 14 in a rotatably switchable manner. The primary workpiece spindles 14 clamp the workpieces 15 at their rear side. The machining of the front side of the workpieces 15 takes place in a machining chamber 16 for the front side machining with the help of tools which are arranged at longitudinal carriages 17 and transverse carriages 18, with the help of which they are adjusted with respect to the workpieces. The arrangement is made in such a manner that the transverse carriages 18 for the front side machining are arranged near the spindle box 12, while the longitudinal carriages 17 can be moved from a rear wall 19 of the machining chamber 16 in the direction towards the primary workpiece spindles 14.

Figure 2:
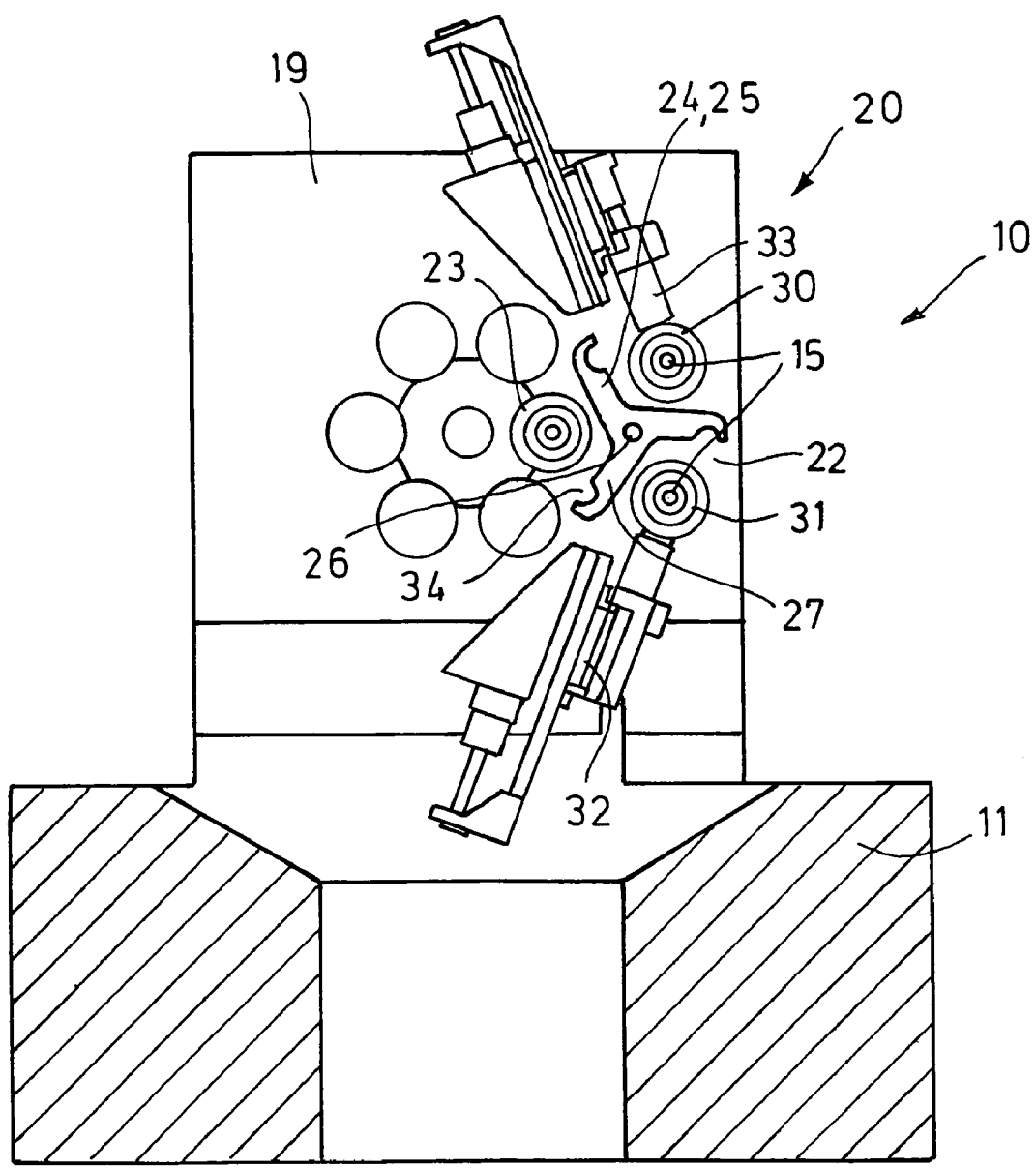
FIG. 2 shows the lathe of FIG. 1 in a section along line II-II.
Figure 3:
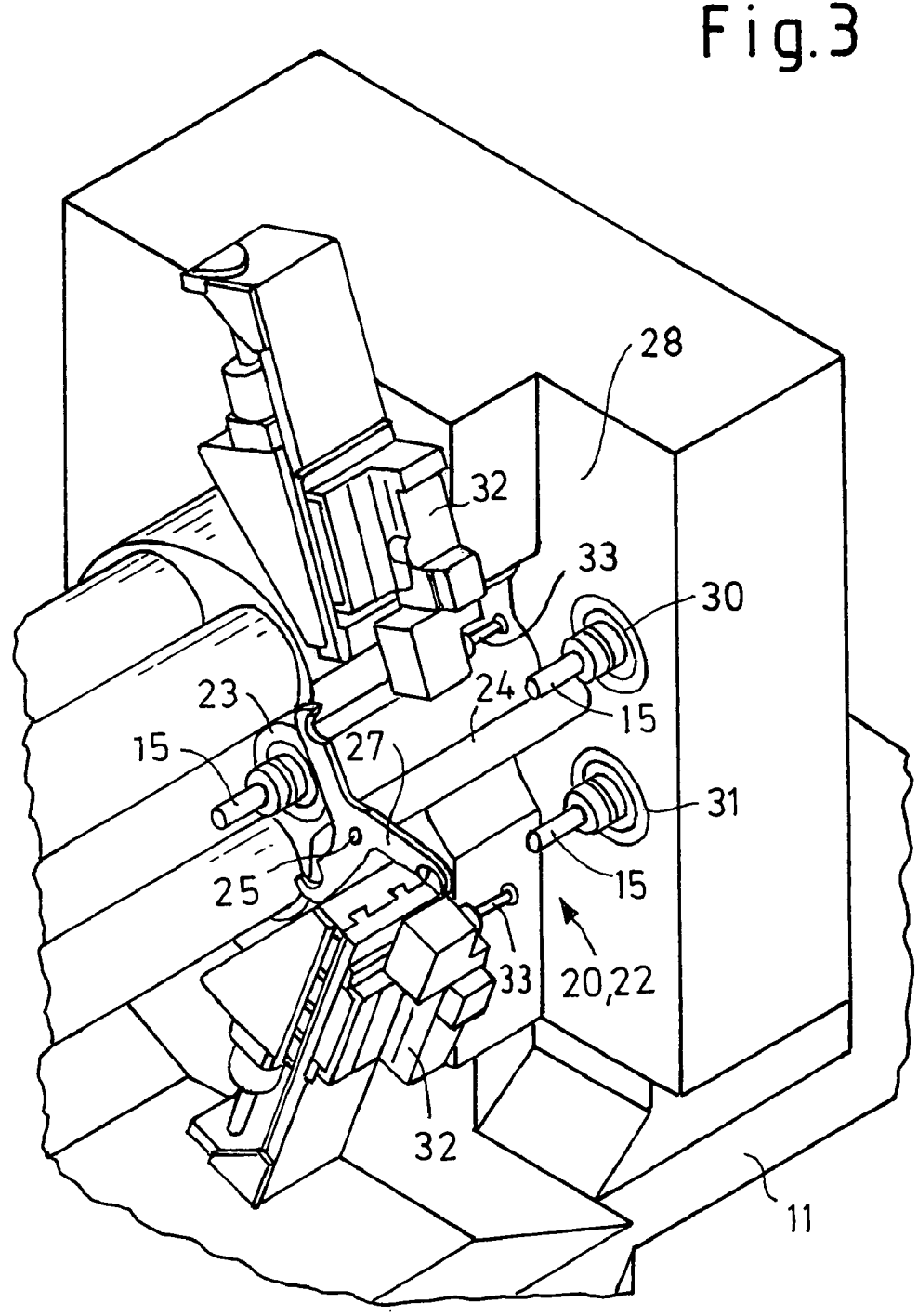
FIG. 3 shows the multi-spindle automatic lathe in a perspective view with a view to the apparatus for machining the workpiece rear side.

The multi-spindle automatic lathe 10 additionally comprises an apparatus 20 for machining the rear side of a workpiece 15. This apparatus includes a transfer device 21 for removing a workpiece machined at its front side from a primary workpiece spindle into a transfer position VI of the spindle drum and a machining station 22 which is located outside the machining chamber 16 for the front side machining. The transfer device comprises a gripper 23 which can be moved in a parallel or coaxial manner to the primary workpiece spindle in the transfer position VI between this and the rear wall 19 of the machining chamber 16 of the machine and a translation device 24, which includes a change-over device 25 arranged a short way in front of the rear wall 19. The change-over device 25 has three grip arms 27 in the embodiment of FIG. 2, which have an even angular distance of 120° from one another and with which the change-over device can be switched rotatably around a swivel axis 26 in three different switching positions as well as rest positions between them.

As has already been mentioned, the machining station 22 for the rear machining is outside the machining chamber 16, in which the workpieces are machined from the front. More precisely, the machining station 22 is arranged in a secondary machining chamber 28 which lies beyond the rear wall 19 of the machining chamber 16 for the front side machining, that is, offset towards the right from the rear wall 19 in FIG. 1. The machining station 22 comprises a secondary workpiece reception 29 with two secondary workpiece spindles 30, 31 in the embodiment according to FIG. 2, which can, similar to the gripper 23, be moved in the axial direction parallel to the axis of the primary workpiece spindle 14 far enough so that they can reach into the transfer region of the translation device 24.

For the machining of the workpieces at their rear side, secondary tool carriages in the form of transverse carriages 32 are provided in the secondary machining chamber 28, which carriages carry tools 33, which can be moved with respect to the workpieces received in the secondary work spindles for machining at their rear side with the help of the carriages.

In operation, when a workpiece in the primary machining chamber 16 has run through all machining steps at its front side, and is then in the machining position VI, it is removed with the help of the transfer device 21 from the primary workpiece spindle 14 present there, so as to transfer it to the machining station 22 for the rear side machining. To this end, the gripper 23 moves out of its rest position in which it projects only a bit from the rear wall 19 into the primary machining chamber 16, axially in the direction towards the primary workpiece spindle 14 and receives there the workpiece 15 to be translated with an empty workpiece chuck received in the gripper, immediately before this is cut off in the known manner. Subsequently, the gripper 23 moves back again, while the workpiece then held in the workpiece chuck and reaches a position in the end position of the gripper 23 in which it can be—together with the chuck—gripped by the change-over device 25 of the translation device 24. Essentially simultaneously to the movement of the gripper 23, the secondary workpiece spindles 30, 31 move forward from their work position shown in FIG. 1, that is to the left, so that the workpieces received therein or the chucks holding these also reach the access region of the change-over device 25. The translation device 24 then indexes the change-over device 25, so that the grip arms 27 with their grip pockets reach into grooves (not shown) at the workpiece chucks of the workpieces and engage these in a manner not shown in detail. The workpieces with the chucks attached thereto are now held completely by the change-over device 25 of the translation device. Subsequently, the gripper 23 or the two workpiece spindles 30, 31, respectively, are brought out of engagement from the previously held workpieces or their workpiece chucks, which takes place by a relative movement in the axial direction between the change-over device 25 of the translation device 24 on the one hand and the two secondary workpiece spindles 30, 31 and the gripper 23 on the other hand. That is, either the change-over device 25 of the translation device 24 is displaced axially in the direction towards the spindle drum 13 as far that the workpieces move out of engagement with the gripper or the secondary workpiece spindles, or these are correspondingly moved in the opposite direction away from the change-over device 25, so that they do not hinder the subsequent switching movement of the translation device with the workpieces and chucks received thereon around the swivel axis 26.

After the change-over device has been moved about 120°, whereas the workpiece previously received by the gripper 23 has been transferred to the first secondary workpiece spindle 30, which had previously been transferred to this received workpiece in the second secondary workpiece spindle 31 and the previously workpiece received therein into the position of the gripper 23, an opposite relative movement takes place between the change-over device 25 and the secondary workpiece spindles 30, 31 or the gripper 23, so as to again position the three workpieces in the secondary workpiece spindles or the gripper. Either a workpiece still clamped into the workpiece chuck is present in the gripper, which was previously completed in two machining steps in the two secondary workpiece spindles at its rear side and completed hereby, or an empty chuck, namely when a completely machined workpiece is already discharged in the region of the machining station 22 for the rear side machining, after this has completed. Meanwhile, in the first secondary workpiece spindle 30 there is received a workpiece which is not yet machined at its rear side and the second secondary workpiece spindle 31 carries a workpiece, which has only been machined partially at its rear side.

If a completely machined workpiece is still in the gripper 23, this is subsequently discharged in the primary machining chamber 16, the chuck though remaining in the gripper 23, so that the new workpiece which has already been machined at the front side in the transfer position VI, can be received. The two secondary workpiece spindles move back into the machining position shown in FIG. 1, in which they are driven in a rotating manner, so that the workpieces can be machined at their rear sides by the tools 33 received in the transverse carriages 32.

It can be seen that the machining of the workpieces at their rear sides in the machining station 22 takes place in a spatially pulled apart manner from the machining of the workpieces at the front side in the primary machining chamber. That is, the workpieces for the front side machining at the transverse carriages 18 and the longitudinal carriages 17 cannot collide with the tools 33 for the rear side machining, so that the movements of the transverse carriages 32 in the secondary machining chamber 28 do not have to be coordinated with the movements of the longitudinal and transverse carriages 17, 18 in the primary machining chamber 16. That is, the machining at the rear side of the workpieces can take place largely independently from that at the front side.

Figure 4:
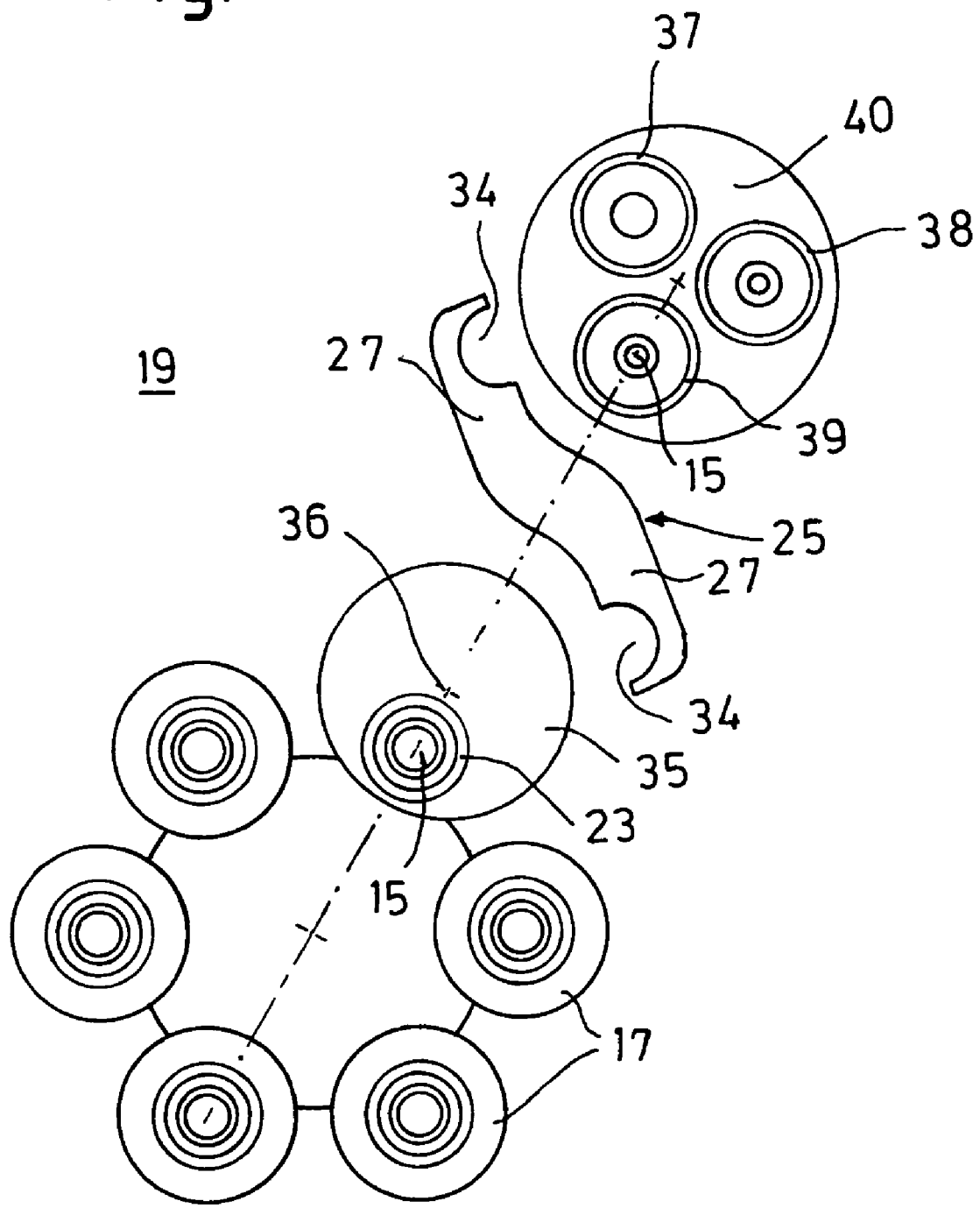
FIG. 4 shows a lathe according to second embodiment in a highly simplified sectional view corresponding to FIG. 2.

FIG. 4 shows a second embodiment of the invention in a highly schematised depiction in the transfer region of the workpieces at the rear wall 19 of the primary machining chamber. In this second embodiment, the gripper 23 is arranged at an axially traversable slider 35 in an eccentric manner, which is designed similar to the longitudinal carriages 17 for the primary machining at the front side of the workpieces. The slider 35 can be rotated around its central axis 36, so that the angular position of the gripper 23 located therein and thereby the one of the workpiece 15 received therein can be changed. The radial distance of the gripper or of the workpiece 15 received therein from the axis of the spindle drum 13 can be changed through this. In this embodiment, the change-over device 25 of the translation device 24 is only provided with two grip arms 27 and grip pockets 34 arranged thereon, so that the pitch circle described by the axes of the grip pockets is not tangent to the pitch circle described by the primary workpiece spindle of the spindle drum 13 as in the first embodiment, but is offset by a degree which is twice as large as the eccentricity with which the gripper is arranged at the slider 35. That is, the workpiece received in the gripper is located in the transfer position at the rear wall 19 of the primary machining chamber 16 further outwardly than the primary workpiece spindle, from which it had been removed previously. By this, there is additionally created space during the transfer of the workpiece to the secondary workpiece reception 29.

In this second embodiment, the secondary workpiece reception comprises three secondary workpiece spindles 37, 38 39, which are arranged at a secondary spindle drum 40, which can be moved completely, that is, together with its three workpiece spindles, axially and be brought into the working scope of the change-over device 25 with two arms. In this embodiment, there is no simultaneous change-over of three workpieces with their workpiece chucks, but only the workpiece which is still not machined at its rear side is moved into one of the three secondary workpiece spindles and simultaneously the workpiece chuck present therein is removed and transferred to the gripper. The completely machined workpiece located previously in the empty, now translated chuck, was already removed before the axial movement of the secondary spindle drum 40 in the secondary machining chamber by a removal gripper (not shown).

The invention is not limited to the shown and described embodiments, but numerous changes and additions are feasible without leaving the scope of the invention. It is for example not compellingly necessary that the workpieces in the machining station 22 for the rear side machining are aligned parallel to the workpieces received in the primary workpiece spindles. A transfer of the workpieces for instance can also take place in such a manner that these then have an orientation in the machining station for the rear side machining, which orientation has an angle of <180°, in particular a right angle to the axis of the spindle drum or the primary workpiece spindles. The change of orientation then takes place conveniently with the help of a suitably formed change-over device, the swivel axis of which can be under an angle of 45° to the displacement axis of the gripper 23 and pivots the workpiece to be transferred with a switching angle of 180° around 90° in its orientation.

When only a simple rearward machining is to take place with the lathe, it can be sufficient to equip the machining station for the rear machining with only one secondary workpiece spindle, if particularly complex machining is necessary at the rear sides of the workpieces, it is feasible to provide a secondary spindle drum with four or more secondary workpiece spindles in the secondary machining chamber.

The invention claimed is:

1. Lathe, in particular multi-spindle automatic lathe having an apparatus for machining the rear side of a workpiece and with a take-over device for removing a workpiece machined at its front side from a primary workpiece spindle of the machine and for transferring the workpiece to a machining station for the rear side machining, the take-over device comprising a gripper traversable parallel or coaxial to the workpiece spindle between the workpiece spindle and a rear side of the machining chamber of the machine, and with a translation device, which takes over the workpiece from the gripper for the transfer to the machining station for the rear side machining, characterized in that the machining station for rear side machining is arranged outside the machining chamber for front side machining and comprises a secondary workpiece reception which can be moved axially between the translation device and a working position for the rear side machining.

2. Lathe according to claim 1, characterized in that the secondary workpiece reception can be moved parallel to the movement direction of the gripper.

3. Lathe according to claim 1, characterized in that the secondary workpiece reception can be moved at a right angle to the movement direction of the gripper.

4. Lathe according to claim 1, characterized in that the translation device is arranged in the region of the rear side of the machining chamber for the front side machining and includes a change-over device which can be switched between at least two switch positions around a swivel axis.

5. Lathe according to claim 1, characterized in that the machining station is arranged in a secondary machining chamber for the rear side machining, which chamber is arranged beyond the rear side of the machining chamber for the front side machining.

6. Lathe according to claim 1, characterized in that the secondary workpiece reception includes a workpiece spindle driven in a rotating manner.

7. Lathe according to claim 1, characterized in that the machining station for the rear side machining comprises several secondary workpiece spindles.

8. Lathe according to claim 7, characterized in that the secondary workpiece spindles are arranged on a secondary spindle drum.

9. Lathe according to claim 7, characterized in that the secondary workpiece spindles are axially movable and a workpiece transfer takes place from one to another secondary workpiece spindle by means of the translation device.

10. Lathe according to claim 1, characterized in that the workpieces can be taken out of the gripper together with workpiece chucks and can be transferred to the machining station for the rear side machining.

11. Lathe according to claim 1, characterized in that the gripper is arranged at an axially moved slider in an eccentric manner and that the slider is rotatable around its central axis.

12. Lathe according to claim 11, characterized in that the slider includes a cylindrical stroke piston or stroke cylinder adjustable in the circumferential direction.

13. Lathe according to claim 1, characterized in that the axis of a primary workpiece spindle in a transfer position is offset laterally to the axis of a holder formed at the translation device by such a degree that is at the most twice as large as the eccentricity with which the gripper is arranged at the slider.

14. Lathe according to claim 1, characterized in that the secondary workpiece reception or the secondary workpiece spindle or spindles forming these are arranged at an axially traversable secondary slider in an eccentric manner and that the secondary slider or sliders are rotatable around their central axis or axes.

15. A lathe, comprising:

an apparatus for machining a rear side of a workpiece;

a take-over device for removing a workpiece machined at a front side thereof in a machining chamber from a primary workpiece spindle and for transferring the workpiece to a machining station for rear side machining, the take-over device including:
  a gripper transversable parallel or coaxial to the primary workpiece spindle between the primary workpiece spindle and a rear side of the machining chamber, and
  a translation device for taking over the workpiece from the gripper for transfer to the machining station for rear side machining; and wherein the machining station for rear side machining is arranged outside the machining chamber for front side machining and includes a secondary workpiece reception axially movable between the translation device and a working position for rear side machining.

16. A multi-spindle automatic lathe, comprising:

a primary workpiece spindle disposed in a machining chamber for machining a front side of a workpiece;

a machining station for machining a rear side of the workpiece, the machining station positioned outside the machining chamber for front side machining;

a gripper transversable parallel or coaxial to the primary workpiece spindle between the primary workpiece spindle and a rear side of the machining chamber; and a translation device for moving the workpiece from the gripper to the machining station for machining the rear side of the workpiece.

17. The multi-spindle automatic lathe of claim 16, wherein the machining station includes a secondary workpiece reception axially movable between the translation device and a working position for machining of the rear side.

18. The multi-spindle automatic lathe of claim 17, wherein the secondary workpiece reception is at least one of movable parallel to a movement direction of the gripper and movable perpendicularly relative to the movement direction of the gripper.

19. The multi-spindle automatic lathe of claim 16, wherein the translation device includes a change-over device switchable between at least two switch positions disposed about a swivel axis.

20. The multi-spindle automatic lathe of claim 16, wherein the machining station is disposed in a secondary machining chamber for machining of the rear side of the workpiece and the secondary machining chamber is spaced from the machining chamber for machining of the front side of the workpiece.

* * * * *